United States Patent
Hamm

(10) Patent No.: US 12,409,522 B2
(45) Date of Patent: Sep. 9, 2025

(54) DEVICE AND METHOD FOR MACHINING A WORKPIECE

(71) Applicant: Siemens Aktiengesellschaft, Munich (DE)

(72) Inventor: Carsten Hamm, Eggolsheim (DE)

(73) Assignee: Siemens Aktiengesellschaft, Munich (DE)

(*) Notice: Subject to any disclaimer, the term of this patent is extended or adjusted under 35 U.S.C. 154(b) by 249 days.

(21) Appl. No.: 18/020,859

(22) PCT Filed: Jul. 2, 2021

(86) PCT No.: PCT/EP2021/068303
§ 371 (c)(1),
(2) Date: Feb. 10, 2023

(87) PCT Pub. No.: WO2022/033766
PCT Pub. Date: Feb. 17, 2022

(65) Prior Publication Data
US 2024/0033873 A1 Feb. 1, 2024

(30) Foreign Application Priority Data
Aug. 13, 2020 (EP) .................................. 20190904

(51) Int. Cl.
*B23Q 15/12* (2006.01)
(52) U.S. Cl.
CPC .................................. *B23Q 15/12* (2013.01)
(58) Field of Classification Search
None
See application file for complete search history.

(56) References Cited

U.S. PATENT DOCUMENTS

| 2009/0013798 A1 | 1/2009 | Hocker |
| 2010/0292822 A1 | 11/2010 | Hahn |
| 2015/0321274 A1 | 11/2015 | Stolzer et al. |

(Continued)

FOREIGN PATENT DOCUMENTS

| CN | 1934426 A | 3/2007 |
| CN | 101198843 A | 6/2008 |

(Continued)

OTHER PUBLICATIONS

PCT International Search Report and Written Opinion of International Searching Authority mailed Sep. 24, 2021 corresponding to PCT International Application No. PCT/EP2021/068303 filed Jul. 2, 2021.

*Primary Examiner* — Ryan A Jarrett
(74) *Attorney, Agent, or Firm* — Henry M. Feiereisen LLC

(57) ABSTRACT

In a method for machining a workpiece with a machining system, the machining system is controlled with at least one control parameter, which is then adapted during machining of the workpiece based on an instantaneous mass of the workpiece or based on an instantaneous moment of inertia of the workpiece. The instantaneous mass of the workpiece or the instantaneous moment of inertia of the workpiece are dependent on a machining progress and are ascertained with reference to a geometric model of the workpiece to be machined based on a density of the workpiece and an instantaneous shape of the workpiece as determined with reference to the geometric model of the workpiece. The geometric model is updated with reference to a machining simulation.

14 Claims, 1 Drawing Sheet

(56) References Cited

U.S. PATENT DOCUMENTS

| | | |
|---|---|---|
| 2017/0072527 A1 | 3/2017 | Krajnik et al. |
| 2018/0143611 A1 | 5/2018 | Wenke et al. |
| 2018/0181694 A1 | 6/2018 | Springer et al. |
| 2019/0162358 A1 | 5/2019 | Wang et al. |
| 2020/0064809 A1 | 2/2020 | Sanders et al. |

FOREIGN PATENT DOCUMENTS

| | | |
|---|---|---|
| CN | 101887252 A | 11/2010 |
| CN | 102686985 A | 9/2012 |
| CN | 105081446 A | 11/2015 |
| CN | 106457503 A | 2/2017 |
| CN | 107111297 A | 8/2017 |
| CN | 109073140 A | 12/2018 |
| DE | 10 2012 223 808 A1 | 6/2014 |
| DE | 10 2015 105 999 A1 | 10/2016 |
| DE | 102016216190 A1 | 3/2018 |
| DE | 10 2016 125 749 A1 | 6/2018 |
| EP | 2 237 122 B1 | 6/2013 |
| EP | 3 518 051 A1 | 7/2019 |
| KR | 2018/0092667 A | 8/2018 |
| RU | 2694447 C1 | 7/2019 |
| WO | WO 2010095667 A1 | 8/2010 |
| WO | WO 2010112217 A1 | 10/2010 |
| WO | WO 2014/095439 A2 | 6/2014 |

DEVICE AND METHOD FOR MACHINING A WORKPIECE

CROSS-REFERENCES TO RELATED APPLICATIONS

This application is the U.S. National Stage of International Application No. PCT/EP2021/068303, filed Jul. 2, 2021, which designated the United States and has been published as International Publication No. WO 2022/033766 A1 and which claims the priority of European Patent Application, Serial No. 20190904.1, filed Aug. 13, 2020, pursuant to 35 U.S.C. 119 (a)-(d).

BACKGROUND OF THE INVENTION

The invention relates to a method for machining a workpiece and to a device for machining a workpiece. In particular, the invention relates to the machining of a workpiece by means of a machine tool, a production machine or an industrial robot.

PRIOR ART

When machining a workpiece, the shape of the workpiece can alter such that the moment of inertia of the workpiece changes during the machining of the workpiece. Such an effect can occur even if the mass of the workpiece itself does not change, for example if the external geometry of the workpiece is altered as a result of reforming or if the density of the workpiece is changed. The material distribution of the workpiece can also alter as a result of transformational operations on the material of the workpiece, for example by means of the application of pressure or temperature or by means of chemical processes, such that the moment of inertia of the workpiece is not constant during the machining.

Additionally or alternatively, the mass of the workpiece can be altered as a result of machining operations. Solely by way of example, reference is made here to metal cutting by machining in the field of aircraft construction, where up to 90 percent by weight can accrue in swarf in the case of structural components, such that the mass decreases significantly during the machining.

The mass can however not only decrease, but can also increase in the case of additive manufacturing processes. Examples of such methods include laser sintering, laser beam melting and electron beam melting.

The mass and/or the moment of inertia of the workpiece are relevant to the open-loop or closed-loop control in so far as certain control parameters may depend on these. For example, parameters relating to motion guidance may be selected allowing for a maximum permitted acceleration, which in turn depends in the maximum effective mass. Certain closed-loop control parameters, for example a turning-moment precontrol, a desired-value filter or similar, are likewise dependent on the mass or the moment of inertia of the workpiece.

The kinematic structure of the machining system governs whether the workpiece or the tool or both are moved when machining of the workpiece. This in turn governs whether the mass or the moment of inertia of the workpiece is relevant to motion in the up to three translational and up to three rotational degrees of freedom. For example, the workpiece may be moved in an x-direction and in a y-direction while the tool is moved in a z-direction. The mass of the workpiece is then relevant to control parameters in an x-direction and a y-direction, but not to control parameters in a z-direction.

The control parameters can be set defensively, the relevant setting then being respectively determined by the heaviest or lightest mass that occurs during the machining, according to the use case. The control parameters are therefore specified statically and do not vary during the machining of the workpiece.

Furthermore, it is also possible for a user to update the mass or the moment of inertia of the workpiece at selected time points during the processing, and trigger a recalculation or reassignment of the control parameters. In order to achieve this, the information relating to the mass or the moment of inertia must be determined in advance and is consequently used as external input variables.

Furthermore, the current inertia can be calculated by means of an online algorithm directly during the machining of the workpiece. With reference to specific ratios, for example uniformly accelerated phases during the machining or separate test runs, it is possible to measure the ratio of force F to acceleration a. From this, the instantaneous mass of the workpiece can be estimated using the known relation $F=m \cdot a$. However, uniformly accelerated phases during the machining are rare. Conversely, separate test runs require additional time and additional expense.

EP3518051A1 discloses a method for determining a strategy for optimizing the operation of a machining system, wherein a motion control of the machining system uses parameters to determine sequences of desired positional values and specifies a respective sequence of desired positional values to each drive controller, wherein the drive controllers use parameters to determine activation signals for a mechanism of a respective positionally controlled axle, said mechanism being driven by a respective drive, and output the activation signals to the respective drive. In this case, a computing facility receives properties of a workpiece that is to be machined by means of the machining system, a description of the type of machining to be performed, a description of the working capacity of the machining system and an optimization target from a user via a user interface and determines, on the basis of the data received and internal determination rules, which parameters of the machining system should be varied in order to optimize operation, which parameters should be varied in order to optimize operation, which measured values should be used to operate the machining system or individual axles when measurements are taken, in order to obtain measurement results that can be usefully evaluated, and which criteria can be used to assess the measurement results that are obtained from the measurements, and outputs the parameters, measured values and criteria that have been determined to the user.

DE102015105999A1 discloses a device and a method for machining a tool by removing material. The tool is first measured in three dimensions using a measuring unit and a three-dimensional virtual tool model is produced therefrom. This virtual tool model is compared with a reference contour from a respective tool data record. If a match is confirmed, a machining program assigned to the tool data record is selected and a desired contour is determined by fitting the reference contour into the three-dimensional virtual tool model. The tool can then be machined on the basis of this desired contour.

US2020064809A1 discloses methods, systems, and devices, including medium-encoded computer program products, for computer aided design and manufacture of physical structures using subtractive manufacturing systems and techniques. The method comprises:
- obtaining a finishing toolpath specification for a three-dimensional geometry of a part;
- generating a 3D geometry of a model of a semi-finished structure in accordance with a computer simulation of deflections experienced by a workpiece as stock material is cut from the workpiece using the finishing toolpath specification;
- creating a pre-finishing toolpath specification for the semi-finished structure; and
- providing the pre-finishing toolpath specification for use in machining the part by cutting away a first portion of the stock material using the pre-finishing toolpath specification to form the semi-finished structure, followed by performing a finishing operation of the semi-finished structure by cutting away a second portion of the stock material to form the part.

The object of the present invention is to perform the machining of the workpiece more efficiently.

SUMMARY OF THE INVENTION

The invention provides a method for machining a workpiece and a device for machining a workpiece having the features in the independent claims. Preferred embodiment variants are the subject matter of the respective subclaims.

The invention allows the workpiece to be machined efficiently, by dynamically adapting control parameters during the machining of the workpiece. In order to achieve this, the instantaneous mass of the workpiece and/or the instantaneous moment of inertia of the workpiece are taken into account.

According to a first aspect, the invention therefore relates to a method for machining a workpiece. A geometric model of the workpiece to be machined is provided. The workpiece is machined by means of a machining system, the machining system being controlled by means of at least one control parameter. The at least one control parameter is adapted during the machining of the workpiece on the basis of the instantaneous mass of the workpiece and/or on the basis of the instantaneous moment of inertia of the workpiece, the instantaneous mass of the workpiece and/or the instantaneous moment of inertia of the workpiece being ascertained with reference to the geometric model.

According to a second aspect, the invention therefore relates to a device for machining a workpiece, said device comprising a machining system and a control facility. The machining system machines the workpiece. The control facility controls the machining system for the purpose of machining the workpiece by means of at least one control parameter. The control facility adapts the at least one control parameter during the machining of the workpiece on the basis of the instantaneous mass of the workpiece and/or on the basis of the instantaneous moment of inertia of the workpiece. The instantaneous mass of the workpiece and/or the instantaneous moment of inertia of the workpiece are ascertained with reference to the geometric model.

As a result of always taking into account the instantaneous mass of the workpiece and/or the instantaneous moment of inertia of the workpiece for the purpose of adapting the at least one control parameter, the machining system can be operated at the limit without running any danger of causing damage to the machine or the workpiece.

In contrast with a defensive method, in which the heaviest or lightest mass is used, dynamic adaptation of the control parameters on the basis of the instantaneous moment of inertia of the workpiece and/or the instantaneous mass of the workpiece allows a markedly more efficient and better utilization of the capacities of the machining system. The machining can therefore take place more quickly.

Furthermore, it is also possible to increase the precision of the machining of the workpiece, because the working mode of the machining system is continuously adapted to the instantaneous values of mass and/or moment of inertia of the workpiece. In particular, this is very advantageous in the case of workpieces requiring a high degree of precision during manufacture, for example in the case of safety-relevant components.

Using the inventive method, the control can therefore be operated in an optimal manner, since the mass or the moment of inertia are dependent on the progress of machining and the control parameters are adapted accordingly. The machining system therefore always operates using the best possible dynamics in terms of open-loop or closed-loop control.

In order to obtain instantaneous values for the mass or the moment of inertia of the workpiece, use is made of a geometric model. A "geometric model" is understood to mean that the geometry of the workpiece is modeled, i.e. that the geometric dimensions of the workpiece are modeled. In particular, the contour of the workpiece can be described by the geometric model. With constant density, the mass of the workpiece can be ascertained by means of multiplication using the volume of the workpiece as defined by the geometric model. The volume of the workpiece can be obtained with reference to the geometric model, for example by means of numeric integration or by splitting the volume into primitive geometric objects (cuboids, simplices, or similar). In the same way, using the known physical relations, the moment of inertia of the workpiece be calculated with reference to density and geometric dimensions.

Both the instantaneous mass of the workpiece and the instantaneous torque of the workpiece can be used for the purpose of adapting the at least one control parameter.

Depending on the type of machining of the workpiece, it is also possible to take into account only the instantaneous mass of the workpiece for the purpose of adapting the at least one control parameter, for example in the case of prismatic machining or in the case of milling.

Furthermore, it is also possible to take into account only the instantaneous torque for the purpose of adapting the at least one control parameter, for example in the case of a lathe.

Provision can also be made for taking into account only the mass of the workpiece or only the torque of the workpiece during certain processing steps. During other processing steps, both the mass and the torque of the workpiece can be taken into account.

According to a further embodiment of the method, a digital twin of the workpiece is created which comprises the geometric model in particular. The digital twin can additionally comprise information relating to material removal or a change in the shape of the workpiece.

According to a further embodiment of the method for machining a workpiece, the geometric model can also comprise information relating to the density distribution of the material of the workpiece. In particular, it is thereby possible to determine the mass or the moment of inertia of the workpiece in the case of inhomogeneous workpieces.

According to a further embodiment of the method for machining a workpiece, the density distribution of the material of the workpiece can also be time-dependent, i.e. dependent on the instantaneous machining step. This means that the density distribution can change during machining of the workpiece. This is advantageous in particular in the context of chemical transformation processes, or when machining the workpiece by means of altering the temperature, or when subjecting the workpiece to a high pressure, whereby the density of the workpiece can alter at least locally.

The machining system can be a machine tool, a production machine or an industrial robot.

According to a further embodiment of the method for machining a workpiece, the geometric model of the workpiece to be machined is adapted during the machining of the workpiece. In order to achieve this, a progress parameter which indicates the progress of the machining of the workpiece can be taken into account. This can be output by the machining system itself. The geometric model can be dependent on the progress parameter. The progress parameter can assume discrete values and can differ for various phases of the processing, for example. The geometric model is adapted at the start of each new phase. In general, the geometric model can be adapted incrementally or continuously.

According to a further embodiment of the method for machining a workpiece, the workpiece is measured during the machining by means of at least one sensor. The geometric model of the workpiece to be machined is adapted using the measurement result of the at least one sensor. Since the mass of the workpiece and/or the moment of inertia of the workpiece are ascertained with reference to the geometric model, mass and/or moment of inertia are altered as a result of adapting the geometric model. Mass and/or moment of inertia of the workpiece are consequently time-dependent, this time-dependency being specified by the adaptation or change of the geometric model.

According to a further embodiment of the method for machining a workpiece, the at least one sensor comprises an optical sensor. In particular, the optical sensor can be a position sensor, a scanner and/or a 3D camera. The instantaneous geometry of the workpiece can be determined by means of a scanner or 3D camera, for example, in order to adapt the geometric model.

According to a further embodiment of the method for machining a workpiece, the machining of the workpiece is simulated in advance, in order to calculate a change of the geometric model during the machining of the workpiece. The simulated change of the workpiece is then used during the actual machining of the workpiece to ascertain the instantaneous mass or the instantaneous moment of inertia.

According to a further embodiment of the method for machining a workpiece, the precalculated change in the mass of the workpiece and/or in the moment of inertia of the workpiece is stored in a look-up table.

According to a further embodiment of the method for machining a workpiece, the machining of the workpiece by means of a machining system comprises an additive manufacturing process.

According to a further embodiment of the method for machining a workpiece, the machining of the workpiece by means of a machining system comprises separative machining of the workpiece. Separative machining comprises in particular metal-cutting and/or dividing the workpiece, in particular by means of punching, laser cutting, etc. Additionally or alternatively, the separative machining of the workpiece can comprise at least one of the following: material removal, splitting and/or cleansing of the workpiece.

According to a further embodiment of the method for machining a workpiece, the at least one control parameter which is adapted during the machining that is done by the machining system comprises a parameter for motion guidance of components of the machining system. This is understood to include the relative motion of the machining system in relation to the workpiece.

According to a further embodiment of the method for machining a workpiece, the at least one control parameter which is adapted during the machining that is done by the machining system comprises a closed-loop control parameter, in particular a precontrol and/or a filter and/or a controller gain. The precontrol can relate for example to at least one force, at least one torque or similar, which occurs during the machining of the workpiece.

According to a further embodiment of the method for machining a workpiece, a maximum acceleration and/or rotational acceleration of the workpiece and/or of components of the machining system are taken into account when adapting the at least one control parameter, these being calculated on the basis of the instantaneous mass of the workpiece and/or on the basis of the instantaneous moment of inertia of the workpiece. The maximum acceleration can be selected as near as possible to an upper limit of the permitted range, depending on the respective machining system.

According to a further embodiment of the method for machining a workpiece, the instantaneous mass of the workpiece and/or the instantaneous moment of inertia of the workpiece are ascertained on the basis of the density of the workpiece and the instantaneous shape of the workpiece, the instantaneous shape of the workpiece being determined with reference to the geometric model of the workpiece.

According to a further embodiment, the device for machining a workpiece comprises at least one sensor for measuring the workpiece during the machining, the control facility being designed to use a measurement result of the at least one sensor in order to determine the instantaneous mass of the workpiece and/or the instantaneous moment of inertia of the workpiece.

According to a further embodiment of the device for machining a workpiece, the at least one sensor comprises a position sensor, a scanner and/or a 3D camera.

BRIEF DESCRIPTION OF THE FIGURES

The properties, features and advantages of the invention as described above, and the manner in which these are achieved, become clearer and easier to understand in connection with the following description of the exemplary embodiments, these being explained in greater detail with reference to the drawings, in which.

DETAILED DESCRIPTION OF THE FIGURES

Figure 1:
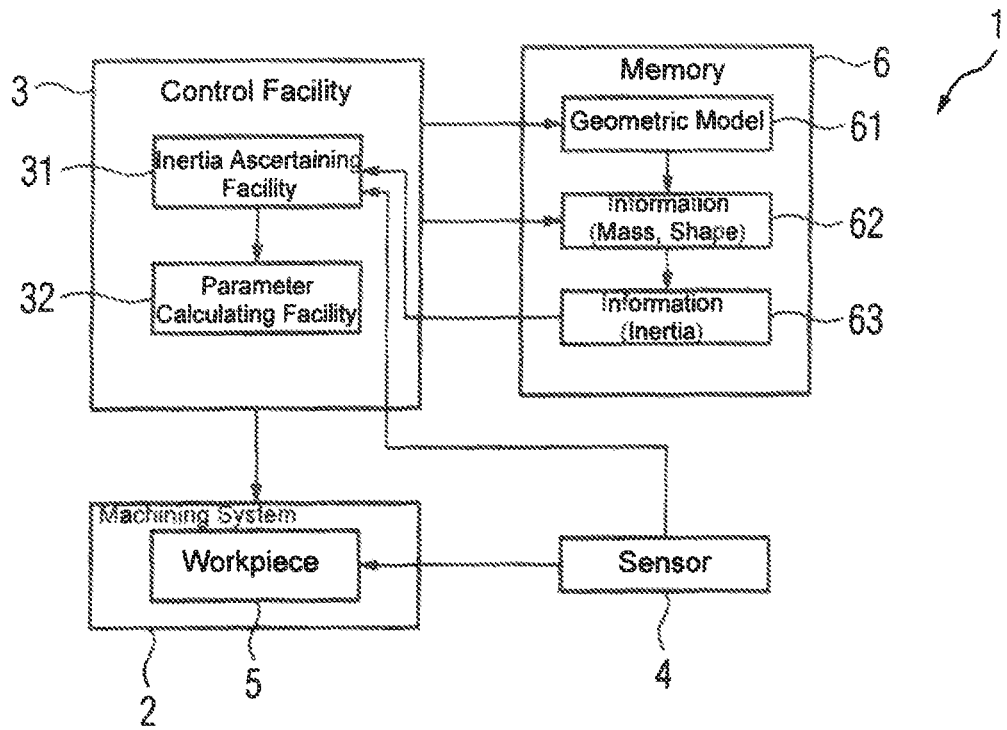
FIG. 1 shows a schematic block diagram of a device for machining a workpiece according to an embodiment of the invention.

FIG. 1 shows a schematic block diagram of a device 1 for machining a workpiece 5. The device comprises a machining system 2, in particular for separative machining of the workpiece 5. Alternatively or additionally, the machining system 2 can also perform additive manufacturing. The machining system 2 can also perform a plurality of method steps or consist of a plurality of part-systems.

The device 1 further comprises a memory 6 in which a digital twin of the machining system 2 is stored. The memory 6 is linked to a control facility 3, which controls the machining system 2 during the machining of the workpiece 5 by means of a control parameter or a plurality of control parameters. The control parameters can comprise for example a parameter for the motion guidance of components of the machining system 2. Additionally or alternatively, the control parameters can comprise a closed-loop control parameter. In particular, it is possible thereby to provide a precontrol, a filter or a controller gain.

The control facility 3 can comprise at least one computing facility which reads out and processes the information that is stored in the digital twin in order to calculate and dynamically adapt the control parameters. The computing facility can comprise software and/or hardware components, for example CPUs, GPUs, microcontrollers, integrated circuits or similar. The memory 6 can be a volatile or non-volatile memory, for example a hard disk, a memory card or similar.

The digital twin comprises a geometric model 61 of the workpiece 5 to be machined. The geometric model 61 describes the three-dimensional shape of the workpiece 5 to be machined. In addition, the geometric model 61 can comprise information relating to a density of the workpiece 5, the density distribution of the workpiece 5, materials of the workpiece 5 or similar.

The geometric twin further comprises information 62 relating to any adaptation or alteration of the geometric model 61, i.e. in particular any alteration of the mass, for example due to removal of material, or any alteration of the geometric shape during the machining of the workpiece 5. Finally, the geometric twin comprises information 63 for ascertaining inertia information, i.e. the mass of the workpiece 5 and/or of the moment of inertia of the workpiece 5.

The control facility 3 adapts the at least one control parameter during the machining of the workpiece 5 on the basis of the instantaneous mass of the workpiece 5 and/or on the basis of the instantaneous moment of inertia of the workpiece 5. For this purpose, the control facility 3 comprises an inertia ascertaining facility 31 which, with reference to the information 63 for ascertaining inertia information and with reference to information relating to an instantaneous progress of the machining, calculates the instantaneous mass of the workpiece 5 and/or the instantaneous moment of inertia of the workpiece 5.

The control facility 3 further comprises a parameter calculating facility 32, which ascertains instantaneous values of the at least one control parameter on the basis of the instantaneous mass of the workpiece 5 and/or the instantaneous moment of inertia of the workpiece 5. As part of this activity, the parameter calculating facility 32 can access a look-up table which is held in the memory 6 and which indicates corresponding values for the control parameters on the basis of the instantaneous mass of the workpiece 5 and/or the instantaneous moment of inertia of the workpiece 5. The at least one control parameter can also be specified as a function of the mass of the workpiece 5 and/or the instantaneous moment of inertia of the workpiece 5, wherein the parameter calculating facility 32 calculates the corresponding value for the respective at least one control parameter by applying the values that have been determined for the instantaneous mass of the workpiece 5 or for the instantaneous moment of inertia of the workpiece 5.

The instantaneous mass of the workpiece 5 or the instantaneous moment of inertia of the workpiece 5 can be determined online or offline.

With online ascertainment, the simulation of the material removal or material addition can take place concurrently with the machining of the workpiece 5 by the machining system 2. The calculation can be performed by the control facility 3 or by an associated computer, as an edge device for example.

With offline ascertainment, the simulation of the change in the workpiece 5, for example the material removal, can be completed in advance of the machining of the workpiece 5. The time-dependent or machining-dependent values for the mass or the moment of inertia are held as supplementary information and retrieved by the control facility 3 during machining of the workpiece 5 by the machining system 2. The calculated values for the mass of the workpiece 5 and/or the moment of inertia of the workpiece 5 can be stored in a look-up table in the memory 6 for this purpose.

For the purpose of calculating the mass or the moment of inertia of the workpiece 5 from the geometric model 61, a volume of the workpiece 5 and a density of the workpiece 5 can be calculated. Given that the geometric model 61 is updated with the progress of the machining simulation, the current mass of the workpiece 5 or the current moment of inertia of the workpiece 5 can continually be calculated therefrom. A currently valid value is therefore always available.

When adapting the at least one control parameter, a maximum acceleration and/or a maximum rotational acceleration of the workpiece 5 and/or of components of the machining system 2 can be taken into account. These can be calculated on the basis of the instantaneous mass of the workpiece 5 and/or on the basis of the instantaneous moment of inertia of the workpiece 5.

Furthermore, the instantaneous mass of the workpiece 5 and/or the instantaneous moment of inertia of the workpiece 5 can be ascertained on the basis of a density of the workpiece 5 and an instantaneous shape of the workpiece 5, the instantaneous shape of the workpiece 5 being determined with reference to the geometric model of the workpiece 5.

The device 1 for machining the workpiece 5 optionally comprises at least one sensor 4, in particular an optical sensor such as a position sensor, a scanner and/or a 3D camera. The at least one sensor 4 captures measured values relating to the workpiece 5 to be machined, continuously or at specified time points. The geometric model 61 of the workpiece 5 to be machined can be adapted on the basis of the measured values.

The invention is not restricted to the embodiments shown here. For example, the machining system 2 can be a CNC (Computerized Numerical Control) system. The calculation can be performed on the CNC system itself, i.e. both the control facility 3 and the memory 6 can be part of the machining system 2.

Figure 2:
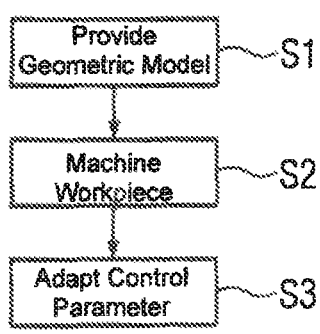
FIG. 2 shows a flow diagram of a method for machining a workpiece according to an embodiment of the invention.

FIG. 2 shows a flow diagram of a method for machining a workpiece 5. The method can be performed by means of a device 1 as described above. Conversely, the device 1 described above can be designed to perform one of the method steps described below.

In a first method step S1, a geometric model 61 is provided for the workpiece 5 to be machined. In particular, it is possible merely to provide an initial value of the geometric model 61. However, there may also be provision to provide the complete temporal course of the geometric model 61 relative to the instantaneous machining progress. For this purpose, the relationship between the geometric model and the respective machining step or machining time can be provided in a look-up table. The machining of the workpiece can be simulated in advance for this purpose, in order to calculate the change of the geometric model during the machining of the workpiece.

In a method step S2, the workpiece is machined by means of a machining system 2, said machining system 2 being controlled by means of at least one control parameter. The machining can comprise separative machining and/or additive machining.

In a method step S3, the at least one control parameter is adapted during the machining of the workpiece 5 on the basis of the instantaneous mass of the workpiece 5 and/or on the basis of the instantaneous moment of inertia of the workpiece 5. The instantaneous mass of the workpiece 5 and/or the instantaneous moment of inertia of the workpiece 5 are ascertained here with reference to the geometric model 61.

The control parameters to be adapted can comprise a parameter for the motion guidance of components of the machining system 2. Furthermore, closed-loop control parameters can also be adapted.

The workpiece 5 can also be measured by means of sensors 4 in order to determine the change of the instantaneous shape of the workpiece 5 and to adapt or update the geometric model 61 accordingly.

Although the invention is illustrated and described in detail above with reference to the exemplary embodiments, the invention is not restricted by the examples disclosed herein and other variations may be derived therefrom by a person skilled in the art without departing from the scope of the invention.

What is claimed is:

1. A method for machining a workpiece with a machining system, the method comprising:
    controlling the machining system with at least one control parameter;
    adapting the at least one control parameter during machining of the workpiece based on an instantaneous mass of the workpiece or based on an instantaneous moment of inertia of the workpiece, wherein the instantaneous mass of the workpiece or the instantaneous moment of inertia of the workpiece are dependent on a machining progress and are ascertained with reference to a geometric model of the workpiece to be machined based on a density of the workpiece and an instantaneous shape of the workpiece as determined with reference to the geometric model of the workpiece;
    updating the geometric model with reference to a machining simulation; and
    machining the workpiece with the machining system.

2. The method of claim 1, further comprising adapting the geometric model of the workpiece during the machining of the workpiece.

3. The method of claim 2, further comprising:
    measuring the workpiece during the machining with at least one sensor; and
    adapting the geometric model of the workpiece using a measurement result from the at least one sensor.

4. The method of claim 3, wherein the at least one sensor comprises a position sensor, a scanner or a 3D camera, or a combination thereof.

5. The method of claim 1, further comprising
    performing the machining simulation of the workpiece in advance; and
    calculating a change of the geometric model during the machining of the workpiece.

6. The method of claim 5, further comprising storing a precalculated change of the mass of the workpiece or of the moment of inertia of the workpiece in a look-up table.

7. The method of claim 5, wherein machining of the workpiece comprises separative machining of the workpiece.

8. The method of claim 1, wherein the machining of the workpiece is performed by an additive manufacturing process.

9. The method of claim 1, wherein the at least one control parameter comprises a parameter for motion guidance of components of the machining system.

10. The method of claim 1, wherein the at least one control parameter comprises a closed-loop control parameter, a pre-control, a filter or a controller gain, or a combination thereof.

11. The method of claim 1, wherein adapting the at least one control parameter comprises taking into account a maximum acceleration or a maximum rotational acceleration of the workpiece or of components of the machining system which are calculated based on the instantaneous mass of the workpiece of based on the instantaneous moment of inertia of the workpiece.

12. A device for machining a workpiece, the device comprising:
    a machining system designed to machine the workpiece; and
    a control facility configured to
        control the machining system using at least one control parameter;
        adapt the at least one control parameter during machining of the workpiece based on an Instantaneous mass of the workpiece or based on an instantaneous moment of inertia of the workpiece, wherein the Instantaneous mass of the workpiece or the Instantaneous moment of inertia of the workpiece are dependent on a machining progress and are ascertained with reference to a geometric model of the workpiece to be machined based on a density of the workpiece and an instantaneous shape of the workpiece as determined with reference to the geometric model of the workpiece; and
        update the geometric model with reference to a machining simulation.

13. The device of claim 12, further comprising at least one sensor for measuring the workpiece during the machining, wherein the control facility is configured to use a measurement result from the at least one sensor for determining the instantaneous mass of the workpiece or the instantaneous moment of inertia of the workpiece.

14. The device of claim 13, wherein the at least one sensor comprises a position sensor, a scanner or a 3D camera, or a combination thereof.

* * * * *